United States Patent [19]

Ahiko

[11] 4,015,431
[45] Apr. 5, 1977

[54] FLOATABLE OIL FENCE

[75] Inventor: Isami Ahiko, Chofu, Japan

[73] Assignee: Suzuei Co. Ltd, Japan

[22] Filed: Mar. 29, 1974

[21] Appl. No.: 456,379

[30] Foreign Application Priority Data

Apr. 2, 1973 Japan .................. 48-38854[U]

[52] U.S. Cl. ........................... 61/1 F; 9/11 A; 114/267; 114/270
[51] Int. Cl.² ...................................... E02B 15/04
[58] Field of Search ................ 61/1 F, 5; 210/242, 210/DIG. 21; 9/11 A; 114/.5 T

[56] References Cited

UNITED STATES PATENTS

| 3,321,923 | 5/1967 | Smith et al. | 61/1 R |
|---|---|---|---|
| 3,608,316 | 9/1971 | Manuel | 61/1 R |
| 3,779,020 | 12/1973 | Muramatsu | 61/1 F |
| 3,783,622 | 1/1974 | Gambel | 61/1 R |
| 3,786,637 | 1/1974 | Muramatsu | 61/1 R |
| 3,792,589 | 2/1974 | Sayles | 61/1 R |
| 3,807,177 | 4/1974 | Oberg | 61/1 R |
| 3,849,989 | 11/1974 | Preus | 61/1 F |

OTHER PUBLICATIONS

"Offshore Boom" A Trade Flyer of Clean Water Inc. P.O. Box 1002, Toms River, N.J. 08753, 3/12/73, © 1973.

*Primary Examiner*—Jacob Shapiro
*Attorney, Agent, or Firm*—Steinberg & Blake

[57] ABSTRACT

A floatable oil fence or boom for limiting the extent to which oil or other matter floating on a body of water can spread. The floatable boom includes an elongated tubular structure for containing air under pressure so as to be rendered floatable. An upper fin is fixed and extends longitudinally along the tubular structure, projecting upwardly therefrom to oppose the movement of water over the tubular structure. A lower fin is fixed to and extends longitudinally along the tubular structure, projecting downwardly therefrom to oppose the movement of the surface of a body of water and any material floating on the surface beneath the tubular structure. A partition structure extends longitudinally along the interior of the tubular structure to divide the latter into a plurality of longitudinally extending chambers which are prevented from communicating with each other by the partition structure, so that in the event that the tubular structure ruptures at one of these chambers the tubular structure nevertheless will remain afloat.

7 Claims, 3 Drawing Figures

FLOATABLE OIL FENCE

BACKGROUND OF THE INVENTION

The present invention relates to floatable oil fences or booms.

Thus, the present invention relates to floatable booms capable of floating on a body of water while confining material such as oil so as to prevent the spread thereof beyond the boom. Such floating booms are known in connection with oil tankers or the like. When such oil tankers are tied up to a dock and unloaded, a floating boom can be extended around the oil tanker so that in the event of oil spillage, the extent to which the oil which floats on the water around the tanker can spread beyond the tanker is limited by the floating boom.

Known floating booms suffer from serious drawbacks. For example one type of known floating boom structure takes the form of pontoons which are stationary. Such structures are difficult to remove and store when not in use, and they are difficult to handle and maneuver.

Another type of floating boom includes floats made of a foamed plastic such as foamed polymers. However such floats have been found not to have sufficient buoyancy to maintain relatively large booms afloat. Such structures also are difficult to handle and maneuver and problems are encountered with storing these types of booms.

A further type of floatable boom is in the form of a hollow tubular structure such as a hose capable of being inflated so as to be rendered floatable as a result of the air contained in such tubular structures. However, these structures are easily damaged by encounters with floating bodies such as rafts and the like. When such bodies collide with the inflated hose type of boom, the result is an easy rupture thereof with consequent sinking.

SUMMARY OF THE INVENTION

It is accordingly a primary object of the present invention to provide a floatable boom which will avoid the above drawbacks.

In particular, it is an object of the present invention to provide a floatable boom which has a high degree of buoyancy so that large booms can be maintained afloat with the structure of the invention.

In addition, it is an object of the present invention to provide a boom of the above type which while having a high degree of buoyancy nevertheless will not sink when colliding with bodies such as rafts or the like.

Moreover, it is an object of the present invention to provide a floatable boom which is easy to handle and store.

Furthermore it is an object of the present invention to provide a floatable boom which is capable of effectively opposing movement of a body of water, as the result of waves or the like, over the boom, as well as effectively opposing movement of a surface of the body of water beneath the boom.

In accordance with the invention the floatable boom includes an elongated tubular means for containing air under pressure so as to assume a floating condition. An upper fin means is fixed to and extends longitudinally along the tubular means, this upper fin means projecting upwardly from the tubular means so as to oppose the movement of water over the tubular means. A lower fin means is fixed to and extends longitudinally along the tubular means, this lower fin means projecting downwardly beyond the tubular means to oppose movement of a surface of a body of water, with any material floating on this surface, beneath the tubular means. An elongated partition means extends along the interior of the tubular means, dividing the interior thereof into a plurality of longitudinally extending chambers which are prevented from communicating with each other by the partition means. As a result, in the event that the tubular means ruptures at one of the chambers, due to collision with a foreign body as referred to above, for example, the tubular means nevertheless will remain afloat. Preferably the tubular means, the upper and lower fin means, and the partition means are made integrally with each other of synthetic rubber reinforced with a nylon fabric embedded therein. The lower fin means may carry at its lower region a chain for weighting the boom at the bottom thereof. With this construction the air under pressure within the tubular means is capable of providing a constant strong buoyancy sufficiently great to maintain afloat even relatively large, broad, heavy booms, so as to prevent in a highly reliable manner the spread of oil or other matter floating on water even though gusts of wind or waves such as delta waves would otherwise cause the undesirable spread of the oil or other matter floating on the water. Furthermore, even if one chamber in the tubular means becomes damaged due to tearing of the tubular means by rafts or the like, the tubular means is maintained afloat by the remaining air which is maintained under pressure in the tubular means. Preferably the partition means is flexible and sufficiently great to bulge outwardly upon rupture of one chamber so as to cause the damaged tubular means substantially to be restored to its initial condition in a fully automatic manner. The tubular means together with the partition means and upper and lower fin means are preferably in the form of a series of sections which are joined one to the next in end-to-end relation. Storing can be carried out simply by deflating the tubular means so that it will sink, and in this simple way it is possible both to store the boom as well as to permit vessels to move over the boom prior to raising thereof by introducing air under pressure into the tubular means. However it is also possible to store the tubular means simply by disassembling the successive sections thereof from each other.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
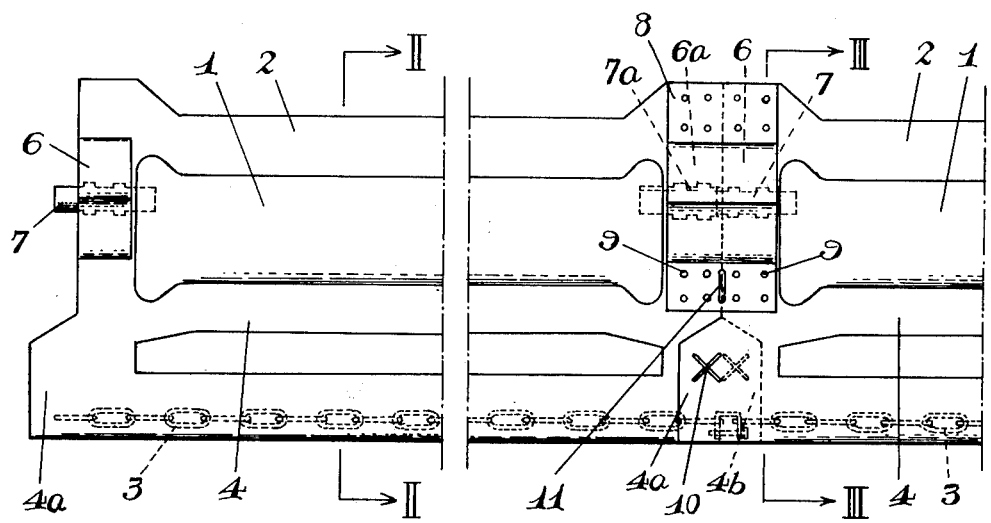
FIG. 1 is a fragmentary schematic illustration of one embodiment of a floatable boom according to the invention, FIG. 1 fragmentarily showing one complete section and part of an adjoining section of the floatable boom of the invention.
Figure 2:
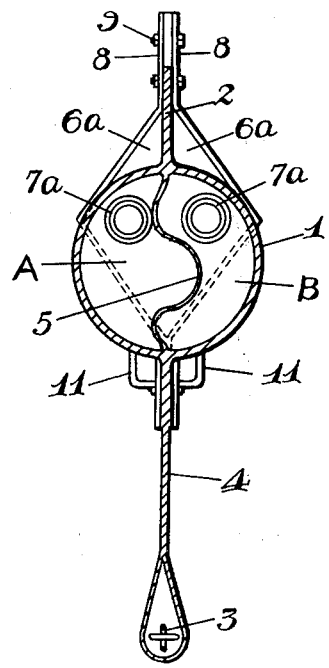
FIG. 2 is a transverse sectional elevation taken along line II—II of FIG. 1 in the direction of the arrows.

Referring to the drawings it will be seen that the floatable boom of the invention which is illustrated therein includes an elongated tubular means 1 for containing air under pressure so as to be capable of floating on a body of water with a considerable buoyancy. Thus, the tubular means 1 may be considered as having the form of an air hose. Fixed to and extending longitudinally along the tubular means 1 is an upper fin means 2 which projects upwardly beyond the tubular means 1 so as to oppose the movement of water over the tubular means 1. A lower fin means 4 is fixed to and extends longitudinally along the tubular means 1, this lower fin means 4 projecting downwardly from the tubular means 1 so as to oppose the movement of the surface of a body of water beneath the tubular means 1. The tubular means 1 together with the upper fin means 2 and the lower fin means 4 are preferably formed of a single body of sheet material so that they are integral with each other. The air under pressure contained within the tubular means 1 provides the boom with a strong buoyancy. The upper fin means 2 acts as a barrier to oppose movement of oil or other matter on the surface of the water over the fence or boom. The lower fin means 4 acts in a manner similar to the keel of a floating vessel, opposing the flow of oil or other matter on the surface of a body of water beneath the tubular means 1. Preferably the tubular means 1 together with the upper fin means 2 and the lower fin means 4 are made of synthetic rubber reinforced with a nylon fabric embedded within the synthetic rubber so that the structure is flexible and resilient.

The lower edge region of the lower fin means 4 is hollow so that it has a longitudinally extending chamber in which a chain 3 is situated, as illustrated. This chain 3 serves as a weight for maintaining the floating boom in the upright condition illustrated in the drawings.

Preferably the floating boom of the invention is formed in a plurality of sections joined one to the next in end-to-end relation in a manner described in greater detail below. Each section is provided at the lower fin means 4 with forwardly and rearwardly extending projections 4a and 4b, respectively, these projections 4a and 4b extending beyond the remainder of each section.

In accordance with one of the important features of the present invention, the elongated tubular means 1 is provided in its interior with an elongated partition means 5 which divides the interior of the tubular means 1 into a plurality of chambers which are prevented from communicating with each other by the partition means 5. In the example illustrated the partition means 5 is in the form of a flexible sheet material having upper and lower edges situated in the common plane of the upper and lower fin means 2 and 4. The flexible partition 5 may be made of the same material as the tubular means 1 and the upper and lower fin means 2 and 4, and is preferably formed integrally therewith. Thus in the illustrated example the partition means 5 divides the interior of the tubular means 1 into a pair of longitudinally extending chambers A and B. The length of the partition 5 between its upper and lower edges is preferably approximately equal to one half the circumference of the tubular means 1. Thus, if the tubular means 1 should rupture for any reason at one of the chambers A or B, the air under pressure in the other of the chambers will immediately expand the partition means 5 to a condition according to which the tubular means 1 will substantially resume its initial configuration, thus bringing about a spontaneous fully automatic expansion and repair of the tubular means 1 to its initial condition. Therefore, tearing of the tubular means 1 at either of its chambers will not prevent the continued operations of the boom.

Figure 3:
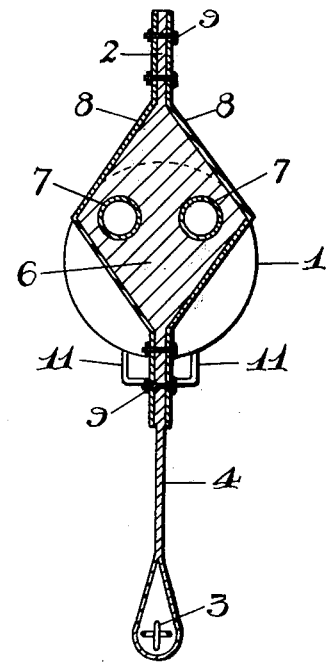
FIG. 3 is a transverse sectional elevation taken along line III—III of FIG. 1 in the direction of the arrows.

Each of the sections terminates in a front end wall 6 and a rear end wall 6a closing off the interior of the tubular means 1 at the ends of each section. However these end walls 6 and 6a respectively carry pipes 7 and 7a. Thus as may be seen from FIG. 3 the end wall 6 of each section carries a pair of pipes 7 passing through the end wall 6, and these pipes respectively communicate with the chambers A and B. Also, the opposed end wall 6a carries a pair of pipes 7a which extend through the end wall 6a and respectively communicate with the chambers A and B. When the several sections are joined together in end-to-end relation, free ends of the pipes 7 which project beyond the end wall 6 are slidably received in the pipes 7a, respectively, so that in this way the chambers of one section communicate with the chambers of the adjoining sections.

The adjoining end walls 6 and 6a at the adjoining end regions of consecutive sections are of matching substantially diamond-shaped configuration, and a plate means 8 is placed in overlapping relation with the adjoining end regions of adjoining sections and fastened together by suitable fasteners 9. The plate means 8 takes the form of a pair of plates of substantially V-shaped configuration conforming to the exterior periphery of the end walls 6 and 6a and engaging these end walls at the end regions of the adjoining sections, overlapping the adjoining end regions. Each of the plates 8 has outwardly extending flat portions engaging opposed surfaces of the end regions of the fin means 2, and the fasteners 9 extend through the plates and the upper fin means 2, as illustrated in the drawings. Thus, the upper regions of the plates 8 by being fastened to each other through the adjoining end regions of the upper fin means 2 of adjoining sections not only serve to connect the adjoining sections to each other but also serve to add to the rigidity of the upper fin means 2, contributing to the maintenance of the latter in an upright condition extending upwardly beyond the tubular means 1. It will be noted that the substantially rigid end walls 6 and 6a also extend upwardly beyond the tubular means 1 to contribute to the rigidity of the upper fin means 2. In addition the pair of plates 8 have lower flat portions engaging opposed surfaces of the lower fin means 4, and at the lower fin means 4 the plates 8 are also fastened together by the fasteners 9. These fasteners 9 may take the form of suitable bolts and nuts, for example, as illustrated.

Thus, the consecutive sections of the floating boom of the invention are held together by the plates 8 and the fasteners 9. In addition, however, each rear projection 4b is received within the forward projection 4a of an adjoining section with the chains of the adjoining sections being connected one to the next by a suitable link of U-shaped configuration, as illustrated at the lower part of FIG. 1. The overlapping projections 4a and 4b are fixed to each other by a fastener means in the form of a cord 10 which is passed through the sheet material which forms the projections 4a and 4b so as to secure them to each other in the manner illustrated in FIG. 1. Thus the overlapping projections 4a and 4b can simply be tied together by the rope or cord 10 for also contributing to the joining of the consecutive sections to each other.

The lower flat parts of the joining plates 8, which overlap the opposed surfaces of the lower fin means 4, are preferably provided with integral loops 11 in the form of substantially U-shaped elements fixed to the plates 8. These loops or eyes 11 enable ropes to be connected to the boom in order to move the latter.

In one specific example of the present invention the tubular means 1 is provided with a diameter of 50 cm, while the upper fin means 2 has a vertical dimension of 20 cm and the lower fin means 4 has a vertical dimension of 100 cm.

Although in the above example the floatable boom has been described as having a pair of internal chambers, it is possible to provide three or more such chambers as required, with the operation being the same described above.

The floatable boom of the invention has many advantages as a result of the air under pressure contained in the tubular means 1 between the upper and lower fins. Thus as a result of this construction the boom of the invention maintains a strong buoyancy even when damaged as by being torn by rafts or the like, because of the spontaneous and rapid recovery of its initial condition with a long uninterrupted operation being assured in this way. In addition the structure of the invention very reliably intercepts oil or other matter floating on a body of water to prevent such matter from moving past the boom either above or below the same even under conditions where there are strong gusts of wind or substantial waves such as delta waves. Furthermore, by connecting the interiors of the tubular means 1 of the several sections with a suitable source of air under pressure, it is possible to deflate the structure permitting it to sink so that it can readily be stored until use of the boom is again required. This latter operation is brought about by again inflating the boom of the invention.

In other words, because the several sections communicate one with the next by way of the pipes 7, 7a, it is possible at a single control station which communicates with only one of the sections to provide for deflation of all of the interconnected sections so that they can sink and be readily stored, and it is also possible by way of operations at such a single station to inflate the entire series of interconnected sections in order to render them again operative.

As is apparent from the above description, with the structure of the invention each tubular means 1 together with the lower fin means 4 fixed to and extending downwardly therefrom and including the weight formed by the chain 3 forms a unit which when the interior of the tubular means 1 is deflated is capable of sinking while when the tubular means 1 is inflated the structure will rise to the surface of the body of liquid on which the structure floats. Moreover, the tubular means 1 together with the lower fin means 4 are in the form of a plurality of sections joined in end-to-end relation with each section terminating in a pair of opposed end walls, these end walls carrying connecting means for connecting the series of sections to each other as well as a means formed by the pipes 7 and 7a for placing the interiors of the consecutive sections at their tubular means in communication with each other so that it becomes possible from a single operating station either to inflate or deflate the entire series of interconnected sections to bring about raising of the floatable boom to the surface on which it floats or sinking of the latter so that through this expedient it becomes possible, without gathering the entire structure together into a single storage location and again extending it from such a storage location, to provide freedom of movement of ships and the like to and from areas which will be at least partly enclosed by the floatable structure when the tubular means of the several sections are inflated.

Of course, the invention may take many different forms without departing from the spirit and scope thereof, and it is to be understood that the invention includes all modifications and variations as come within the scope of the appended claims.

What is claimed is:

1. In a floatable boom, elongated tubular means for containing air under pressure so as to be rendered floatable, upper fin means fixed to and extending longitudinally along said tubular means, said upper fin means extending upwardly from said tubular means for opposing the movement of water and material floating thereon over said tubular means, lower fin means fixed to and extending longitudinally along said tubular means, said lower fin means extending downwardly from said tubular means for opposing the movement of the surface of a body of water and any material thereon beneath said tubular means, and elongated partition means situated in the interior of and extending longitudinally along said tubular means for dividing the interior thereof into a plurality of longitudinally extending chambers, said partition means preventing said chambers from communicating with each other so that in the event of rupture of said tubular means at one of said chambers, said tubular means will nevertheless remain afloat, said tubular means and upper and lower fin means being in the form of a plurality of sections joined in end-to-end relation, each section terminating in a pair of end walls carrying pipes which pass through said end walls and respectively communicate with said chambers, and the pipes of each section communicating with the pipes of adjoining sections so that the chambers of the several sections communicate with each other through said pipes.

2. The combination of claim 1 and wherein said tubular means, upper and lower fin means, and partition means are all formed integrally with each other.

3. The combination of claim 2 and wherein said tubular means, upper and lower fin means, and partition means are made of synthetic rubber reinforced with nylon fabric embedded therein.

4. The combination of claim 1 and wherein said upper and lower fin means are located in a common plane passing diametrically through said tubular means, said partition means being made of a flexible sheet material and having upper and lower edges located in said common plane so that said partition means forms an extension of said upper and lower fin means, said partition means having between said upper and lower fin means a length at least approximately equal to one half the circumference of said tubular means so that upon rupture of a chamber on one side of said partition means the latter will bulge outwardly to provide the tubular means with an interior volume substantially equal to that which it had prior to rupture of said tubular means.

5. The combination of claim 1 and plate means engaging and overlapping each pair of consecutive sections at their adjoining ends, said plate means engaging at least said upper fin means of said consecutive sections at outer surface regions thereof, and fastener means extending through said plate means and at least through said upper fin means of consecutive sections for fastening the latter to each other.

6. The combination of claim 5 and wherein said plate means also engage outer surfaces of said lower fin means of adjoining sections and said fastener means also extending through said lower fin means and said plate means for fastening consecutive sections to each other.

7. The combination of claim 1 and said lower fin means of each section having forwardly and rearwardly extending end projections which extend beyond the remainder of each section, and said end projections of consecutive sections overlapping each other, and fastener means fastening the overlapping end projections of consecutive sections to each other.

* * * * *